US012762092B2

(12) United States Patent
Popovich

(10) Patent No.: US 12,762,092 B2
(45) Date of Patent: Oct. 13, 2026

(54) WRITE-ONCE-READ-MANY IN CLOUD FOR FILE SYSTEMS BACKED UP TO OBJECT STORAGE

(71) Applicant: Dell Products L.P., Round Rock, TX (US)

(72) Inventor: Evgeny Popovich, Coquitlam (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/886,393

(22) Filed: Sep. 16, 2024

(65) Prior Publication Data

US 2026/0079892 A1 Mar. 19, 2026

(51) Int. Cl.

| | |
|---|---|
| ***G06F 16/182*** | (2019.01) |
| ***G06F 16/11*** | (2019.01) |
| ***G06F 16/174*** | (2019.01) |
| ***G06F 16/18*** | (2019.01) |

(52) U.S. Cl.

CPC ........ *G06F 16/1844* (2019.01); *G06F 16/128* (2019.01); *G06F 16/1752* (2019.01); *G06F 16/1873* (2019.01)

(58) Field of Classification Search

CPC ............... G06F 16/1844; G06F 16/128; G06F 16/1752; G06F 16/1873

USPC .......................................................... 707/634

See application file for complete search history.

(56) References Cited

U.S. PATENT DOCUMENTS

| | | | | |
|---|---|---|---|---|
| 2016/0253373 | A1* | 9/2016 | Fryc | G06F 8/65 707/695 |
| 2018/0075051 | A1 | 3/2018 | Bowman et al. | |
| 2020/0341659 | A1* | 10/2020 | Chauhan | G06F 3/067 |
| 2021/0303522 | A1 | 9/2021 | Periyagaram et al. | |
| 2021/0405879 | A1 | 12/2021 | Popovich et al. | |
| 2023/0147671 | A1* | 5/2023 | Narulkar | G06F 16/1748 707/692 |
| 2023/0205899 | A1 | 6/2023 | Harres et al. | |

OTHER PUBLICATIONS

How S3 Versioning works. AWS Documentation, Jul. 2024, pp. 1-7. https://docs.aws.amazon.com/AmazonS3/latest/userguide/versioning-workflows.html. (Year: 2024).*

(Continued)

*Primary Examiner* — Cam Y T Truong

(74) *Attorney, Agent, or Firm* — Amin, Turocy & Watson, LLP

(57) ABSTRACT

Write-once-read-many in cloud for file systems backed up to object storage (e.g., using a computerized tool), is enabled. For example, a system can comprise at least one processor, and at least one memory that stores executable instructions that, when executed by the at least one processor, facilitate performance of operations. The operations can comprise identifying changes to data in a file of a file system relative to a first version of an object chunk representative of the data in an object store, wherein the data is determined to comprise a defined data retention policy, copying changed data, of the data, from the file system to a second version of the object chunk, and copying unchanged data, of the data, from the first version of the object chunk to the second version of the object chunk.

19 Claims, 10 Drawing Sheets

(56) References Cited

OTHER PUBLICATIONS

Hoad, et al. Methods for Identifying Versioned and Plagiarized Documents. Journal of the American Society for Information Science and Technology, 54(3):203-215. (Year: 2003).*

Dell "Dell PowerScale SmartSync" Dell Technologies, Jun. 2024, 26 pages.

Superna "Golden Copy Overview" Superna, Inc. , https://manuals.supernaeyeglass.com/project-eyeglass-administration-guides/HTML/golden-copy-overview.html, Last Accessed Jun. 18, 2024, 5 pages.

Unknown "Using S3 Object Lock" AWS, https://docs.aws.amazon.com/AmazonS3/latest/userguide/object-lock.html, Last Accessed Aug. 25, 2024, 7 pages.

Unknown " PutObject", AWS, https://docs.aws.amazon.com/AmazonS3/latest/API/API_PutObject.html, Last Accessed Aug. 28, 2024, 35 pages.

Popovich, Evgeny, et al. "File System Full and Incremental Replication to Object Storage Systems" U.S. Appl. No. 18/767,305, filed Jul. 9, 2024, 47 pages.

Non-Final Office Action received for U.S. Appl. No. 18/767,305 dated Jan. 8, 2026, 11 pages.

Final Office Action received for U.S. Appl. No. 18/767,305 dated Jun. 24, 2026, 13 pages.

* cited by examiner

WRITE-ONCE-READ-MANY IN CLOUD FOR FILE SYSTEMS BACKED UP TO OBJECT STORAGE

BACKGROUND

File storage systems organize data hierarchically using directories and subdirectories, which can be accessed via file paths with protocols, such as network file system (NFS) or server message block (SMB). File storage systems are often utilized in implementations that require strong consistency and frequent updates, such as home directories and shared file repositories. Conversely, object storage systems store data as discrete objects in a flat address space with unique identifiers. Object storage systems excel in handling large volumes of unstructured data, such as backups and multimedia files, offering scalability and durability. Examples of object storage systems include Amazon Web Services (AWS) Simple Storage Service (S3) and Microsoft Azure Blob Storage. There exists increasing demand for functionality to store file system datasets (e.g., a set of directories and files) in the cloud on object stores using cloud-native object storage application programming interfaces (APIs) (e.g., AWS S3 or Microsoft Azure Blob Storage). Some users require support of immutability (e.g., for a certain period of time).

The above-described background relating to file storage systems and object storage systems is merely intended to provide a contextual overview of some current issues and is not intended to be exhaustive. Other contextual information may become further apparent upon review of the following detailed description.

DETAILED DESCRIPTION

Figure 1:
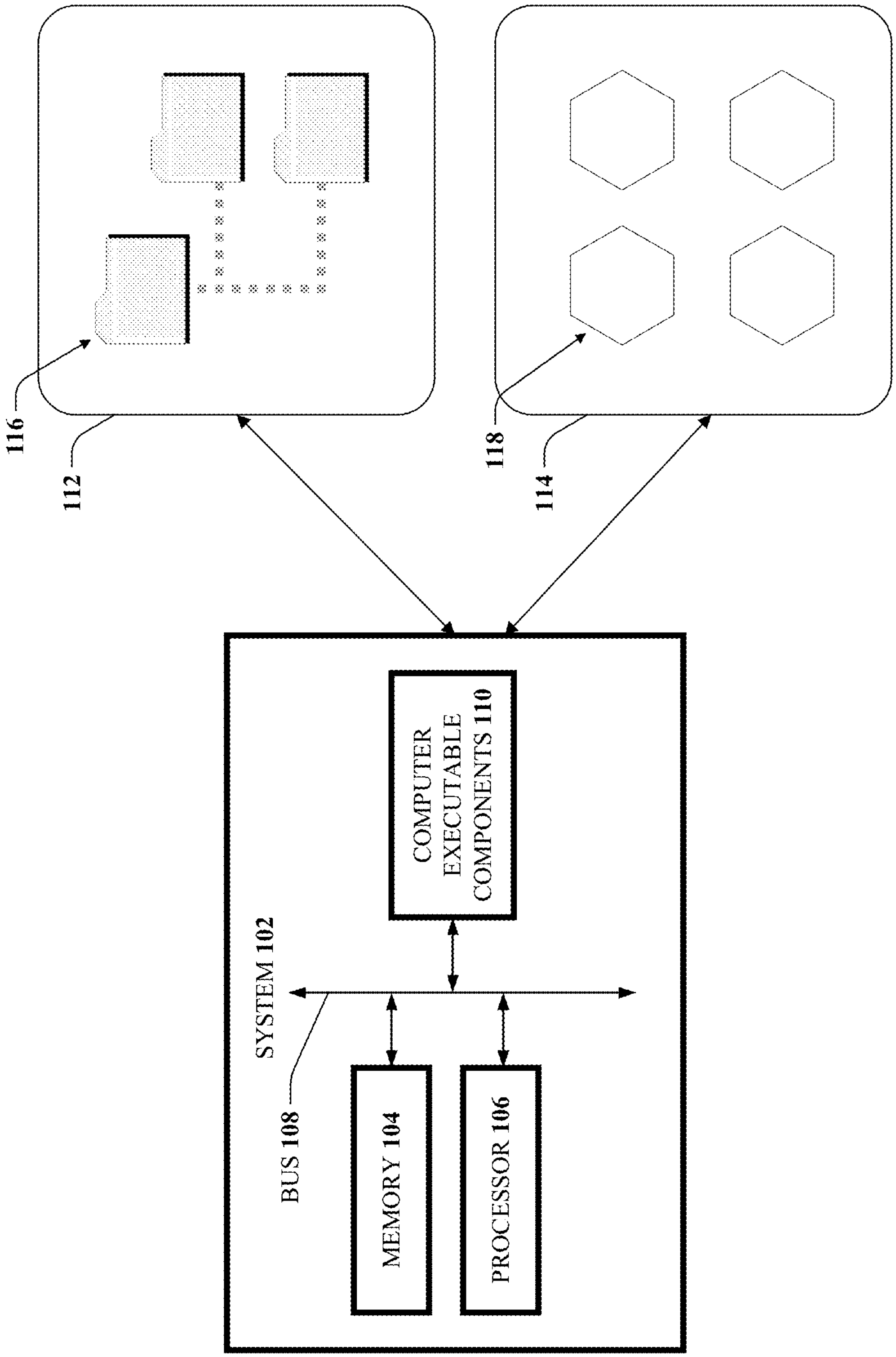
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Existing file to object replication techniques lack incremental updates and instead utilize a one-to-one relationship between a file and an object, and lose fidelity (e.g., sparseness and hard links). Moreover, directory renames are prohibitively expensive for existing file-to-object incremental replication techniques. Further, existing techniques lack immutability support.

As alluded to above, file system backup to object storage can be improved in various ways, and various example embodiments are described herein to this end and/or other ends.

According to an example embodiment, a system can comprise at least one processor, and at least one memory that stores executable instructions that, when executed by the processor, facilitate performance of operations, comprising identifying changes to data in a file of a file system relative to a first version of an object chunk representative of the data in an object store, wherein the data is determined to comprise a defined data retention policy, copying changed data, of the data, from the file system to a second version of the object chunk, and copying unchanged data, of the data, from the first version of the object chunk to the second version of the object chunk.

In one or more example embodiments, the above operations can further comprise designating the second version of the object chunk as a head object in the object store.

In one or more example embodiments, the above operations can further comprise designating the first version of the object chunk as a prior version in the object store.

In one or more example embodiments, the above operations can further comprise generating a snapshot object, wherein the snapshot object comprises an empty object that comprises metadata pointing to the first version of the object chunk.

In one or more example embodiments, the object chunk can comprise a dataset identifier applicable to the file system.

In one or more example embodiments, the object chunk can comprise a file identifier applicable to the data.

In one or more example embodiments, a first object name of the first version of the object chunk and a second object name of the second version of the object chunk can be respectively based on version numbers of the object chunk.

In another example embodiment, a non-transitory machine-readable medium can comprise executable instructions that, when executed by a processor, facilitate performance of operations, comprising determining changes to data stored in a file system relative to an initial version of an object chunk representative of the data in an object store, wherein the data is determined to comprise a defined write-once-read-many data retention policy, storing changed data, of the data, from the file system to an updated version of the object chunk, and storing unchanged data, of the data, from the initial version of the object chunk to the updated version of the object chunk.

In one or more example embodiments, the initial version of the object chunk can comprise a first version in a baseline replication of the file system to the object store.

In one or more example embodiments, the updated version of the object chunk can comprise a version in an incremental replication of the file system to the object store.

In one or more example embodiments, the storing of the changed data of the data to the object store can comprise utilizing a pseudo-copy-on-write replication of the file system to the object store.

In one or more example embodiments, the object chunk can be between approximately 4 megabytes and approximately 8 megabytes.

In one or more example embodiments, the object store can comprise a cloud-based object store.

In one or more example embodiments, the defined write-once-read-many data retention policy can comprise a defined retention time or defined deletion permissions.

In yet another example embodiment, a method can comprise detecting, by a system comprising a processor, modifications to a file of a file system relative to a first version of an object chunk, representative of a portion of the file, in an object store, wherein the file is determined to comprise a defined data retention rule, copying, by the system, modified data, of the file, from the file system to a second version of the object chunk in the object store, and copying, by the system, unmodified data, of the file, from the first version of the object chunk to the second version of the object chunk in the object store.

In one or more example embodiments, the defined data retention rule can comprise a defined write-once-read-many data retention rule.

In one or more example embodiments, the object chunk can be among of a group of object chunks representative of the file system stored in a data bucket, of the object store, applicable to the file system.

In one or more example embodiments, the above method can further comprise, in response to copying the modified data and copying the unmodified data, changing, by the system, a designated head object from the first version of the object chunk to the second version of the object chunk.

In one or more example embodiments, the first version of the object chunk and the second version of the object chunk can be among a group of versions of the object chunk, and the group of versions of the object chunk can comprise additional versions of the object chunk, in addition to the first version of the object chunk and the second version of the object chunk.

In one or more example embodiments, the above method can further comprise, in response to a determination that an age of the first version of the object chunk satisfies a deletion criterion of the defined data retention rule, deleting, by the system, the first version of the object chunk, wherein the deletion criterion is a function of a defined elapsed time since creation of the first version of the object chunk.

Various example embodiments herein can rely on an object stores'ability to filter objects in a bucket based on prefixes. Building object names in a hierarchical manner enables listing all objects owned by the specified dataset, listing all objects in a dataset owned by the specified file, obtaining a complete file layout (e.g., non-sparse and sparse file regions), and obtaining a partial file layout for the given offset/length pair.

Various requirements can include immutability for a certain period of time (e.g., write-once-read-many, or WORM) of file datasets replicated from a file system to object stores in the cloud (e.g., to AWS S3). Such datasets can be, for instance, either full or incremental. In various example embodiments, WORM herein can comprise dataset immutability for a specified period of time. AWS S3 provides an object lock feature which, when enabled on a bucket and on objects, guarantees that the objects in that bucket cannot be deleted or overwritten or modified for a defined period of time. In this regard, object lock requires object versioning enabled on a bucket, meaning if an object is overwritten, its older version still remains in the bucket with a unique version identifier (id). In various example embodiments, an object lock can be set on individual objects. In a nonlimiting example, there can be two types of locks: retention and legal holds. Retention lock expires after a certain period of time. Legal holds have to be manually removed.

Retention locks can, for instance, have two modes: compliance and governance. Compliance locks cannot be removed by any user with any permissions. Objects protected by compliance locks cannot be removed until the lock expires. Governance locks can be reset by users with special permissions. Objects protected by governance locks can be removed by users with special permissions. Retention periods can be extended in both compliance and governance retention modes. Various example embodiments herein utilize compliance locks to provide stronger WORM guarantees. Embodiments herein can utilize AWS S3 object locks, for instance, to achieve WORM feature for baseline and incremental datasets.

For efficient storage of diffs between datasets, the HEAD will remain always populated. Therefore, to support compliance mode, versioning herein can be enabled on the bucket, so that object locks can be enabled and used, and compliance retention locks can be set on all objects in the dataset. With versioning enabled on the bucket, when a file incremental update is handled, overwriting HEAD objects will keep the older HEAD object in a separate object version. To reduce the overhead of storing a whole chunk (e.g., a 128 MB chunk) for each chunk update (e.g., even if only a single KB file block has been modified), the chunk size for the dataset can be reduced to a smaller size (e.g., 4 MB or 8 MB). Copy-on-write (CoW) objects can be pointers/redirects to HEAD versions of chunks and will not hold actual file data. This is, for instance, to avoid storing duplicate amount of data of modified chunks (e.g., the HEAD object version and the CoW object). To create a redirect object, the version of the HEAD object can be fetched with an additional S3 HeadObject call.

In order to support dataset expiration as part of file-to-object replication, two objects for every chunk can be removed: the object belonging to the specific dataset (e.g., with dsid_Y prefix) and the HEAD object version that the dsid_Y_. . . . points to.

In various example embodiments, HEAD can represent the latest dataset(s). In this regard, all HEAD objects need to have the retention period of the latest dataset. However, if a HEAD chunk has not been modified, its retention period remains that of an older dataset.

To ensure the retention period of the HEAD dataset remains accurate, the untouched HEAD objects'retention period needs to be extended periodically.

The desired HEAD objects retention period can be stored in the dataset metadata for each incremental replication. This is, for instance, to enable a post-processing job to periodically extend HEAD objects'expiration time, and to avoid dependency on the availability of the system with source datasets. This way, the post-processing job can be executed from any location and/or from any system.

Embodiments herein thus enable object locks that are utilized to provide WORM guarantees for file-to-object datasets, while keeping incremental backups to object stores efficient.

Turning now to FIG. 1, there is illustrated an example, non-limiting system 102 in accordance with one or more example embodiments herein. System 102 can comprise a computerized tool, which can be configured to perform various operations relating to write-once-read-many in cloud for file systems backed up to object storage. The system 102 can comprise one or more of a variety of components, such as memory 104, processor 106, bus 108, and/or computer executable components 110. In various example embodiments, one or more of the memory 104, processor 106, bus 108, and/or computer executable components 110 can be communicatively or operably coupled (e.g., over a bus or wireless network) to one another to perform one or more functions of the system 102. In various example embodiments, the system 102 can further comprise and/or be communicatively coupled to file system 112 and/or object store 114.

Figure 2:
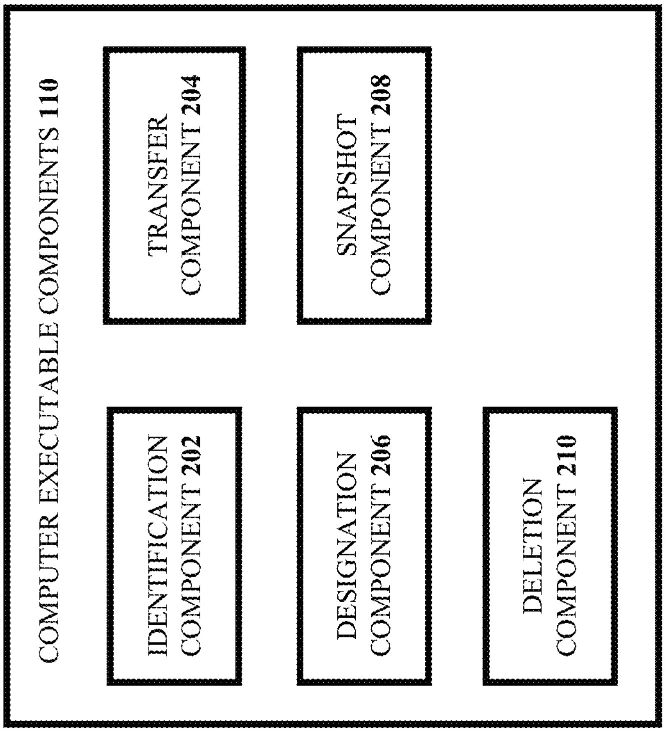
FIG. 2 is a block diagram of a non-limiting example computer executable modules in accordance with one or more example embodiments described herein.

FIG. 2 illustrates a block diagram of example, non-limiting computer executable components 110 that can facilitate write-once-read-many in cloud for file systems backed up to object storage in accordance with one or more embodiments described herein. Repetitive description of like elements employed in other embodiments described herein is omitted for sake of brevity. As shown in FIG. 2, the one or more computer executable components 110 can comprise the identification component 202, transfer component 204, designation component 206, snapshot component 208, and/or deletion component 210. It is noted that while various components described herein can perform one or more corresponding functions, processes, or actions, the computer executable components 110 as a whole and/or the processor 106 can be configured to perform one or more of the described functions, processor, or actions.

According to an embodiment, the identification component 202 can identify changes to data in a file 116 of a file system 112 relative to a first version (e.g., an initial version) of an object chunk 118 representative of the data in an object store 114. In this regard, the identification component can compare a current version of the file 116 to a prior version of the file 116 and/or to data representative of the file 116 in the object store 114. In various example embodiments, the data herein can be determined (e.g., via the identification component 202) to comprise a defined data retention policy (e.g., a defined write-once-read-many data retention policy). It is noted that the defined write-once-read-many data retention policy can comprise a defined retention time or defined deletion permissions. In various example embodiments, the file system 112 can comprise a computer, server, mobile device (e.g., smartphone, tablet, wearable device), hard drives, solid state drives, or other suitable devices.

In one or more example embodiments, the object chunk 118 can comprise a dataset identifier applicable to the file system. Further, the object chunk 118 can comprise a file identifier applicable to the data. In this regard, each dataset can be allocated (e.g., via the designation component 206) a globally unique dataset ID (gdsid) (e.g., a dataset identifier). These gdsids can be later utilized to identify concrete versions of a file. Embodiments herein can rely on generation and allocation globally unique file IDs (gfids) (e.g., respective file identifiers) for files and directories, and utilization of those gfids to identify objects that are to be updated in the cloud on incremental updates. It is noted that a single gfid is utilized for all versions of a file. For example, if a file has three versions (e.g., snapshots), all of them will share the same gfid. To identify a specific version in the cloud, a {gfid, gdsid} tuple can be utilized herein.

In various example embodiments, a first object name of the first version of the object chunk 118 and a second object name of the second version of the object chunk 118 can be respectively based on version numbers of the object chunk 118. In one or more example embodiments, the first version of the object chunk 118 can comprise a first version in a baseline replication of the file system 112 to the object store 114. In further embodiments, the second version of the object chunk 118 can comprise a version in an incremental replication of the file system 112 to the object store 114. In one or more example embodiments, the object chunk 118 can be between approximately 4 megabytes and approximately 8 megabytes, though such a size range is nonlimiting and other suitable sizes of the object chunk 118 are envisaged. It is not that, in various example embodiments, the object store 114 can comprise a cloud-based object store. In one or more example embodiments, the object chunk herein can be among of a group of object chunks representative of the file system 112 stored in a data bucket, of the object store 114, applicable to the file system 112.

According to an embodiment, the transfer component 204 can copy changed data, of the data, from the file system 112 to a second version (e.g., an updated version) of the object chunk 118. In various example embodiments, the transfer component 204 can additionally, or alternatively, copy unchanged data, of the data, from the first version of the object chunk 118 to the second version of the object chunk 118. In this regard, the copying by the transfer component 204 can comprise, for the respective files, assigning a dataset identifier to respective object names and assigning respective file identifiers to the respective object names. In various example embodiments, the transfer component 204 can determine an object storage service applicable to the file system 112, authenticate, and/or configure with the object store 114 using applicable credentials, such as access keys, service accounts, or other suitable credentials. The transfer component 204 can further prepare the files on the file system 112, which can comprise compressing the files or other suitable file preparation. In various example embodiments, the copying of the changed data of the data to the object store 114 can comprise utilizing a pseudo-CoW replication of the file system 112 to the object store 114. By utilizing (e.g., via the transfer component 204) a pseudo-CoW, the CoW will not CoW new data (e.g., changed data), but will instead create an empty object (e.g., a snapshot object) with a pointer to a prior version chunk.

According to an embodiment, the designation component 206 can designate the second version of the object chunk 118 as a head object in the object store 114. In various example embodiment, the designation component 206 can additionally, or alternatively, designate the first version of the object chunk 118 as a prior version in the object store 114.

In various example embodiments, the snapshot component 208 can generate a snapshot object 510. In this regard, the snapshot object 510 can comprise an empty object that comprises metadata pointing to the first version of the object chunk 118. In one or more example embodiments, the designation component 206 can, in response to the copying (e.g., via the transfer component 204) the modified data and copying (e.g., via the transfer component 204) the unmodified data, change a designated head object from the first version of the object chunk 118 to the second version of the object chunk 118. In various example embodiments, the first version of the object chunk 118 and the second version of the object chunk 118 can be among a group of versions of the object chunk 118. In this regard, the group of versions of the object chunk 118 can comprise additional versions of the object chunk 118, in addition to the first version of the object chunk 118 and the second version of the object chunk 118.

In one or more example embodiments, the deletion component 210 can, in response to a determination that an age of the first version of the object chunk 118 satisfies a deletion criterion of the defined data retention rule, delete the first version of the object chunk 118. In this regard, the deletion criterion can be a function of a defined elapsed time since creation of the first version of the object chunk 118.

Figure 3:
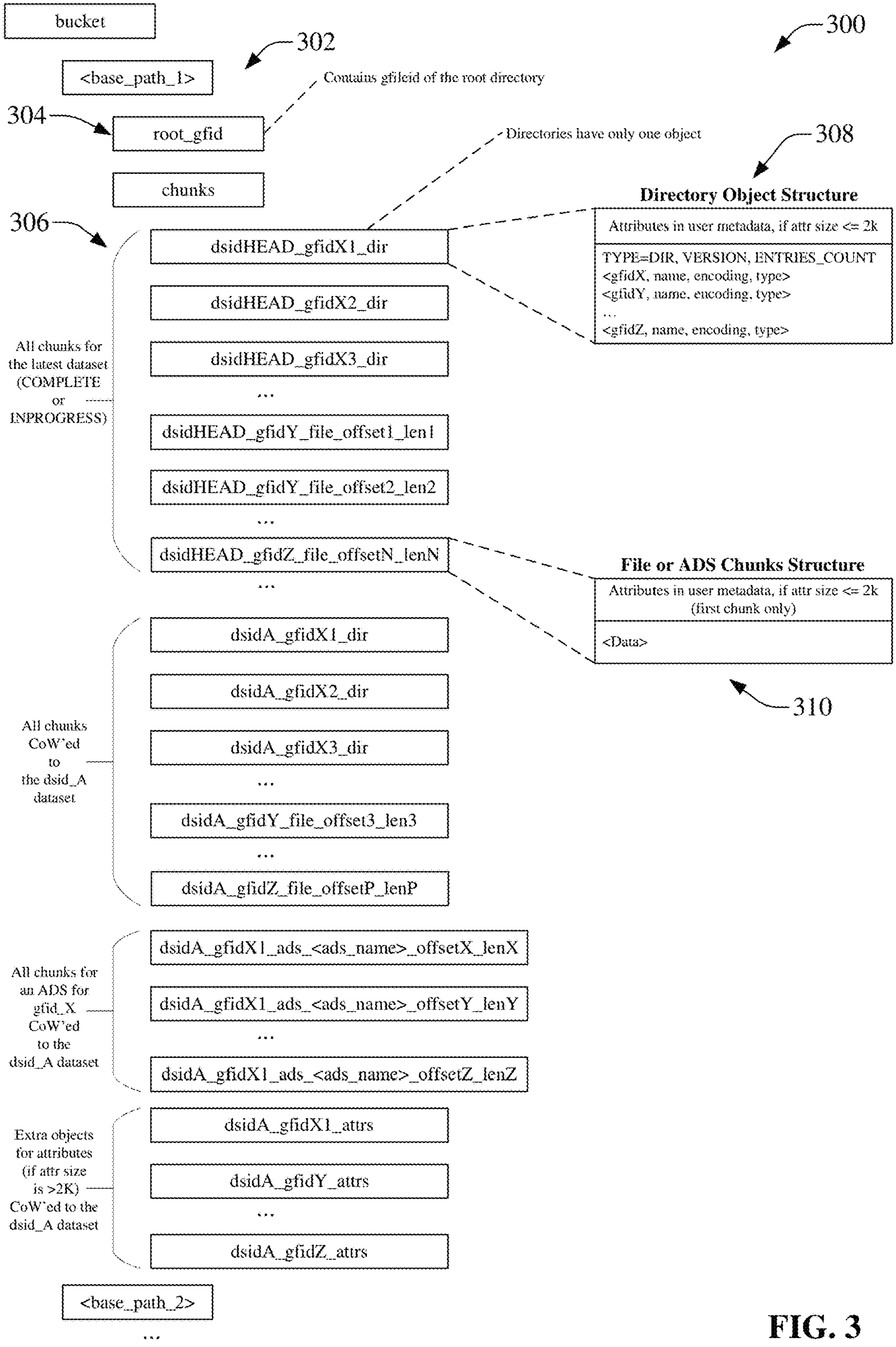
FIG. 3 is a diagram of an example bucket structure in accordance with one or more example embodiments described herein.

FIG. 3 is a diagram of an example bucket structure 300 in accordance with one or more example embodiments described herein. In various example embodiments, the bucket structure 300 can comprise a lineage of datasets (e.g., baseline and/or incremental) using objects stored in an object store 114 (e.g., presented in the cloud). In this example, the datasets are stored with the <base_path_1> prefix 302, so it is possible to store multiple lineages in the same cloud store bucket. The root_gfid object 304 contains the gfid of the dataset root directory. The <base_path_1/chunks/> prefix (e.g., folder) 306 contains objects representing all the versions of all the directories, files, alternate data streams, and/or files or directories attributes. The directory object structure 308 can contain attributes in user metadata (e.g., if attribute size is less than or equal to 2 kb). For instance, the file or alternate data stream (ADS) chunk structure 310 contain attributes in user metadata (e.g., if attribute size is less than or equal to 2 kb) (e.g., of a first chunk only). In various example embodiments, such attributes can comprise access bits (e.g., access control lists that define permissions for reading and/or writing of files herein). In some embodiments, if metadata herein is small (e.g., less than or equal to 2 kb), then the metadata can be stored in the user-defined metadata of the first chunk corresponding to a file. If the metadata herein is large (e.g., greater than 2 kb), then a new object can be created to store the attributes.

Figure 4:
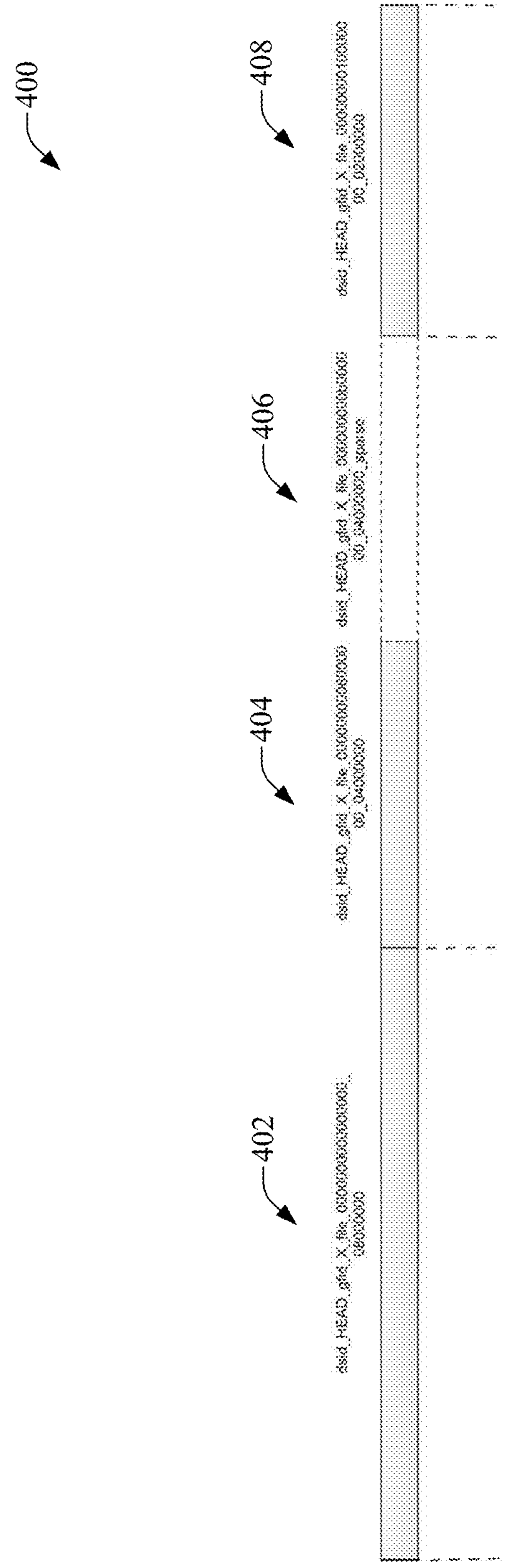
FIG. 4 is a diagram of an example head version of a file in accordance with one or more example embodiments described herein.

FIG. 4 is a diagram of an example head version 400 of a file in accordance with one or more example embodiments described herein. In various example embodiments herein, files can be split into 128 MB object chunks, so one file can be represented by multiple objects, for instance, if a file is larger than 128 MB. In various example embodiments, files herein can comprise holes (e.g., sparse regions) in the files. In FIG. 4, as a nonlimiting example, four objects are depicted (e.g., objects 402, 404, 406, and 408). In FIG. 4, objects 402 and 404 can have data stored therein, which thus represent data chunks of the corresponding file. The third object (e.g., object 406) can comprise a _sparse suffix, which can be empty (e.g., a sparse region). The object 408 can also have data stored thereon. The first element in the name of the objects can be the global dataset ID. The second element in the name of the objects can be the global file ID. The third element in the name of the objects can be the offset (e.g., where the chunk starts). The next element in the name of the objects can be the length of a particular chunk. The foregoing is how a file in the HEAD (e.g., latest dataset) can be represented.

Embodiments herein define a HEAD dataset (e.g., objects with dsidHEAD prefix), which represents the latest dataset in a lineage of datasets. In various example embodiments described herein, dsidHEAD is fully populated. In this regard, there are no gaps in file regions. If there is no transfer-in-progress, then dsid{latest_gdsid} content is dsid-HEAD content. In a nonlimiting example, the layout herein splits files on 128 MB boundaries. There can be a single chunk representing the whole 128 MB range (e.g., as with object 402), or there could be multiple chunks (e.g., as with object 404 and object 406), depending on if there are sparse regions in a 128 MB extent (e.g., object 406). It is noted that chunks herein do not cross the 128 MB boundary (e.g., or another suitable boundary)—not in HEAD and not in snapshots/datasets. The foregoing enables efficient file layout lookup. In various example embodiments, the naming convention for objects representing file chunks can be: <gdsid>_<gfid>_file_<hex_offset>_<hex_len>[_sparse]

For example, the HEAD version of a file can appear as depicted in FIG. 4. The example in FIG. 4 represents a 288 MB file, with sparse region 192 MB to 256 MB. Such a file is represented using four objects (e.g., objects 402, 404, 406, and 408), three data objects (e.g., objects 402, 404, and 408) and one empty object (e.g., object 406) to represent the sparse region. With this approach, the layout is stored in objects names, so that filtering objects by <gdsid>_<gfid>_file prefix will yield a file version layout. Using the hex format for offset facilitates eases in listing layout, for instance, starting from a specific region of a file.

The length part of object names above can be a fixed-length 32-bit number in hex, though other suitable lengths are envisaged, and the fixed-length 32-bit number is thus nonlimiting. Chunks up to 2 GB in size inclusive, for instance, can be represented using this layout (e.g., assuming the chunk boundary is a 2^x number). However, the length field size does not have to be constant and can thus be any number, since there is no filtering expected based on the length part of the name.

Figure 5:
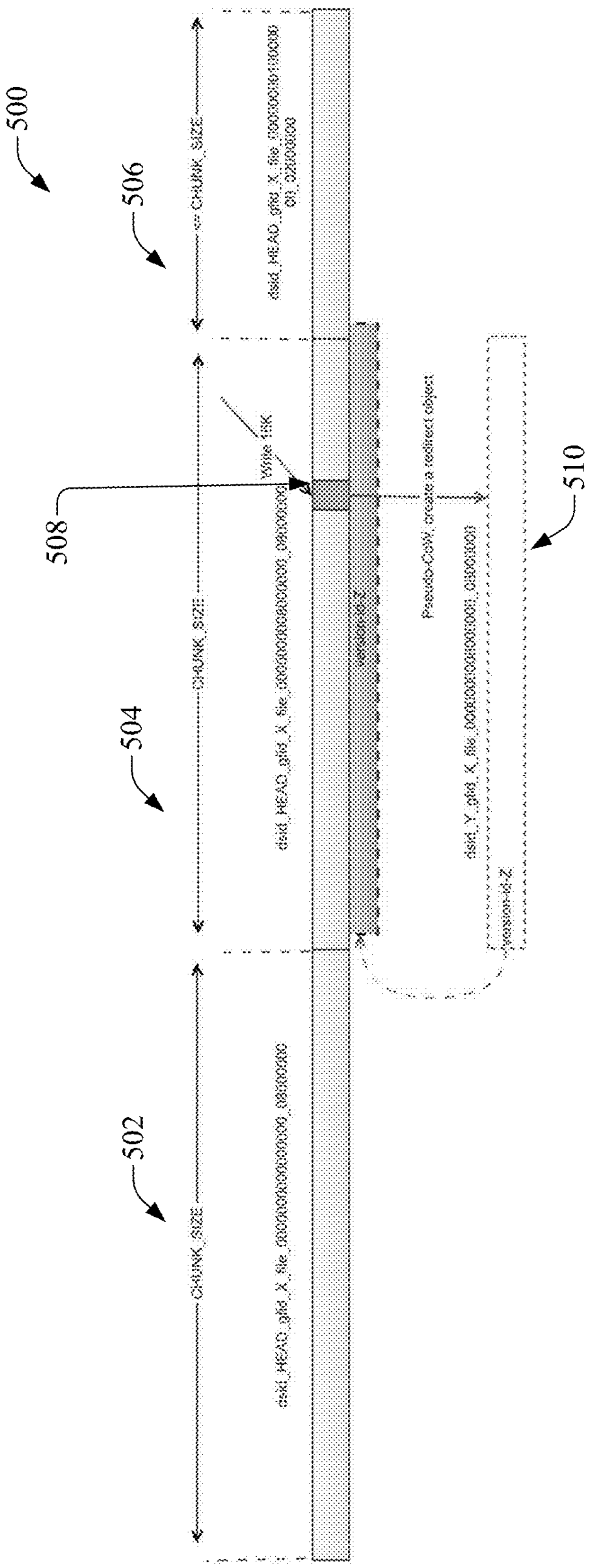
FIG. 5 is a diagram of example data copying in accordance with one or more example embodiments described herein.

FIG. 5 is a diagram of example data copying in accordance with one or more example embodiments described herein. In various example embodiments, an object 500 can comprise chunk 502, chunk 504, and/or chunk 506. When new data 508 (e.g., 16 KB) is copied (e.g., via the transfer component 204) from a file system 112 to the object store 114 comprising the object 500, the new data 508 can replace corresponding data from chunk 504, and a first version of the object 500 can thus be replaced with a second (e.g., updated) version of the object 500, while the first version (as unmodified) of the object 500 can be stored (e.g., via the transfer component 204) as a prior version (e.g., to comply with WORM guarantees). The transfer component 204 can thus write a new DSID head chunk in the object store 114, while the older version remains version id-Z (e.g., a nonlimiting example name) in the object store 114. By utilizing (e.g., via the transfer component 204) a pseudo-CoW, the CoW will not CoW the 16 KB (e.g., new data 508), but will instead create an empty object (e.g., snapshot object 510) with a pointer to the version id-Z chunk. When some data on the file system 112 is determined (e.g., via the identification component 202) to be modified on the file system 112, the transfer component 204 can upload that data (e.g., the new data 508) to the object store 114, but will only copy the new data 508 from the file system 112, while the remaining portions of the chunk 504 will be copied (e.g., via the transfer component 204) from the existing version of the chunk 504. Then, the old version of the chunk 504 will remain in the object store 114, but under a different version ID than the current HEAD object version of the chunk 504. In various example embodiments, the snapshot component 208 can generate the snapshot object 510, which can comprise an empty object that comprises metadata pointing to the first version of the chunk 504.

Figure 6:
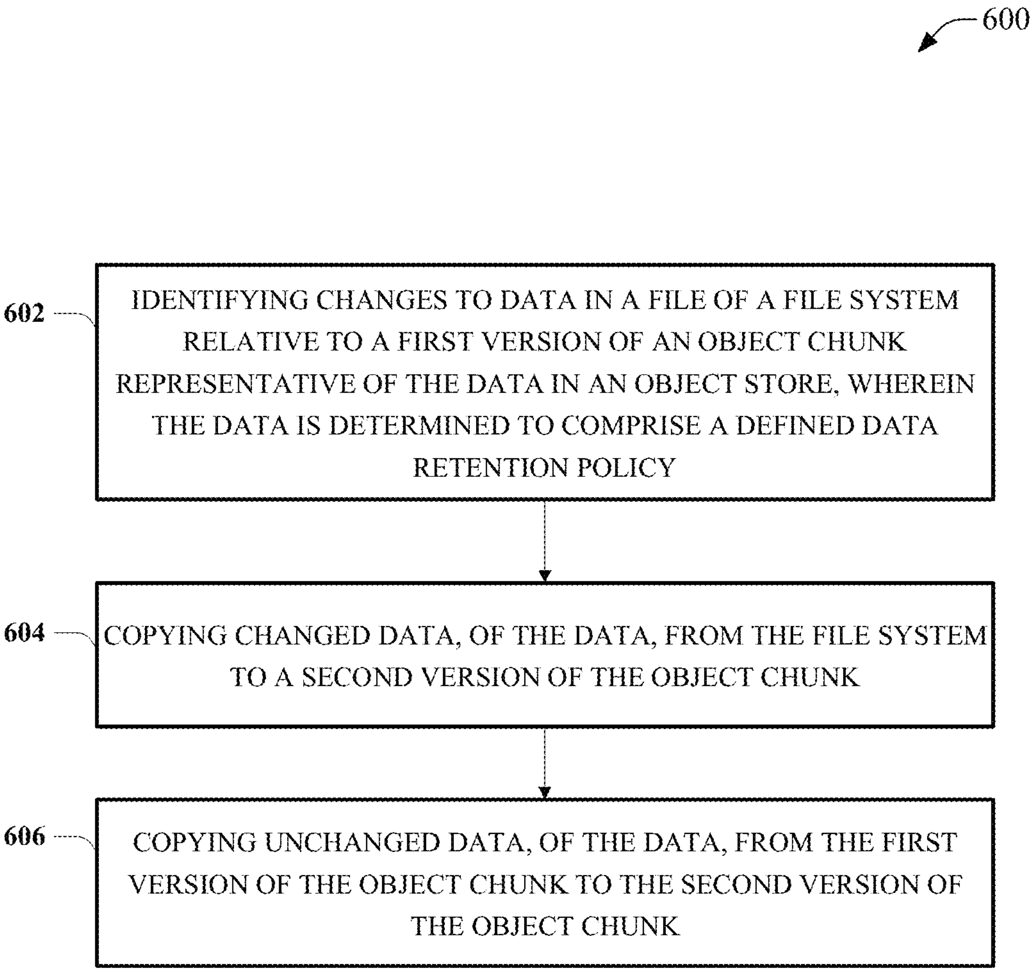
FIG. 6 is a flow diagram for a process associated with write-once-read-many in cloud for file systems backed up to object storage in accordance with one or more example embodiments described herein.

FIG. 6 illustrates a flow diagram for a process 600 associated with write-once-read-many in cloud for file systems backed up to object storage in accordance with one or more embodiments described herein. At 602, the process 600 can comprise identifying (e.g., via the identification component 202) changes to data in a file 116 of a file system 112 relative to a first version of an object chunk 118 representative of the data in an object store 114, wherein the data is determined (e.g., via the identification component 202) to comprise a defined data retention policy. At 604, the process 600 can comprise copying (e.g., via the transfer component 204) changed data, of the data, from the file system 112 to a second version of the object chunk 118. At 606, the process 600 can comprise copying unchanged data, of the data, from the first version of the object chunk 118 to the second version of the object chunk 118.

Figure 7:
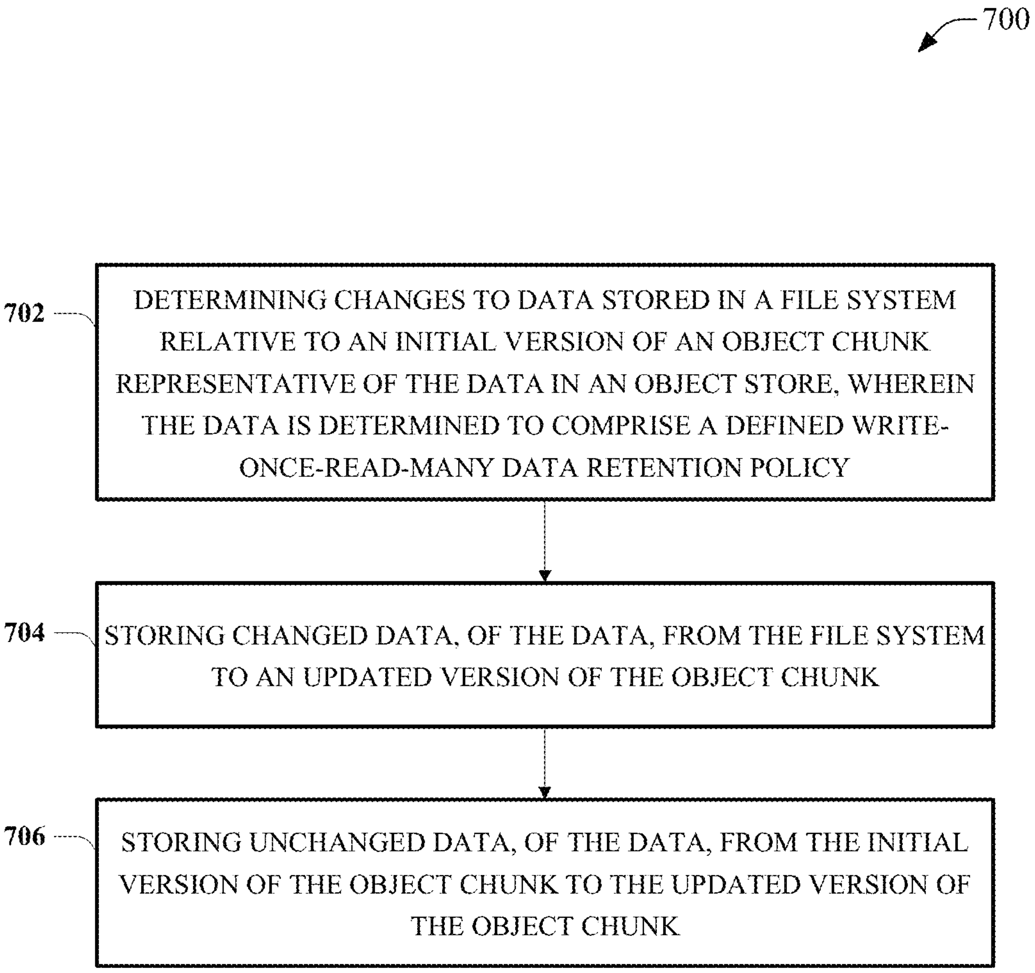
FIG. 7 is a flow diagram for a process associated with write-once-read-many in cloud for file systems backed up to object storage in accordance with one or more example embodiments described herein.

FIG. 7 illustrates a flow diagram for a process 700 associated with write-once-read-many in cloud for file systems backed up to object storage in accordance with one or more embodiments described herein. At 702, the process 700 can comprise determining (e.g., via the identification component 202) changes to data (e.g., of file 116) stored in a file system 112 relative to an initial version of an object chunk 118 representative of the data in an object store 114, wherein the data (e.g., of file 116) is determined (e.g., via the identification component 202) to comprise a defined write-once-read-many data retention policy. At 704, the process 700 can comprise storing (e.g., via the transfer component 204) changed data, of the data (e.g., of file 116), from the file system 112 to an updated version of the object chunk 118. At 706, the process 700 can comprise storing (e.g., via the transfer component 204) unchanged data, of the data (e.g., of file 116), from the initial version of the object chunk 118 to the updated version of the object chunk 118.

Figure 8:
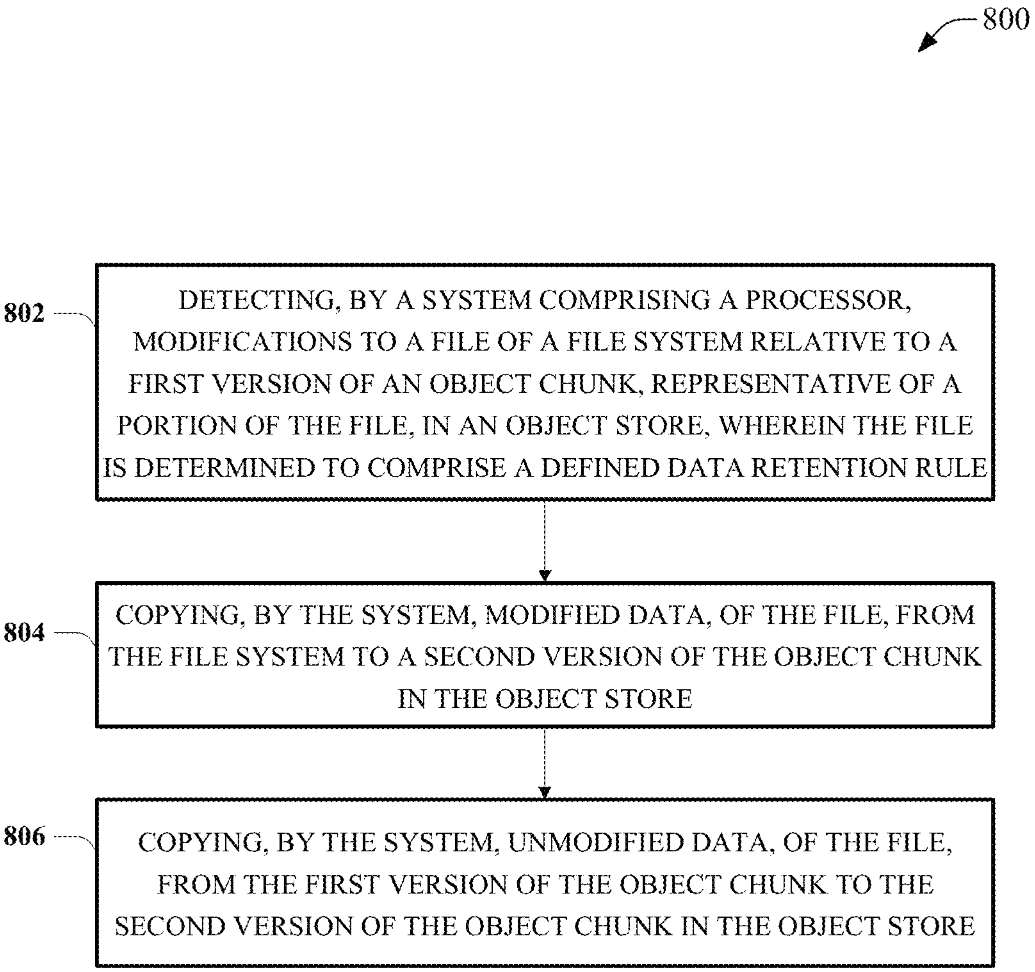
FIG. 8 is a flow diagram for a process associated with write-once-read-many in cloud for file systems backed up to object storage in accordance with one or more example embodiments described herein.

FIG. 8 illustrates a flow diagram for a process 800 associated with write-once-read-many in cloud for file systems backed up to object storage in accordance with one or more embodiments described herein. At 802, the process 800 can comprise detecting (e.g., via the identification component 202), by a system comprising a processor, modifications to a file 116 of a file system 112 relative to a first version of an object chunk 118, representative of a portion of the file 116, in an object store 114, wherein the file 116 is determined (e.g., via the identification component 202) to comprise a defined data retention rule. At 804, the process 800 can comprise copying (e.g., via the transfer component 204), by the system, modified data, of the file 116, from the file system 112 to a second version of the object chunk 118 in the object store 114. At 806, the process 800 can comprise copying (e.g., via the transfer component 204), by the system, unmodified data, of the file 116, from the first version of the object chunk 118 to the second version of the object chunk 118 in the object store 114.

Figure 9:
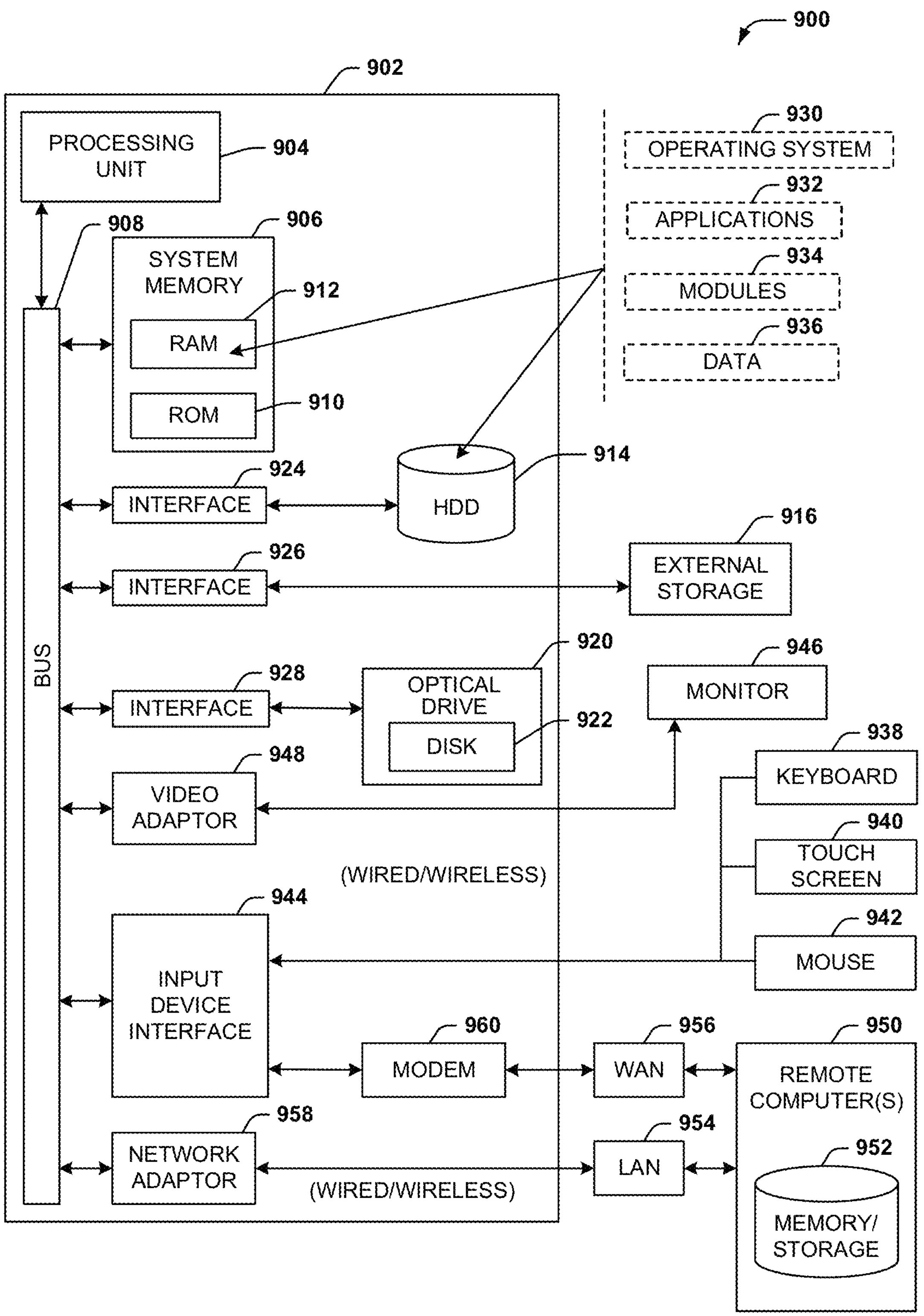
FIG. 9 is an example, non-limiting computing environment in which one or more embodiments described herein can be implemented.

In order to provide additional context for various example embodiments described herein, FIG. 9 and the following discussion are intended to provide a brief, general description of a suitable computing environment 900 in which the various example embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, modules, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various example embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
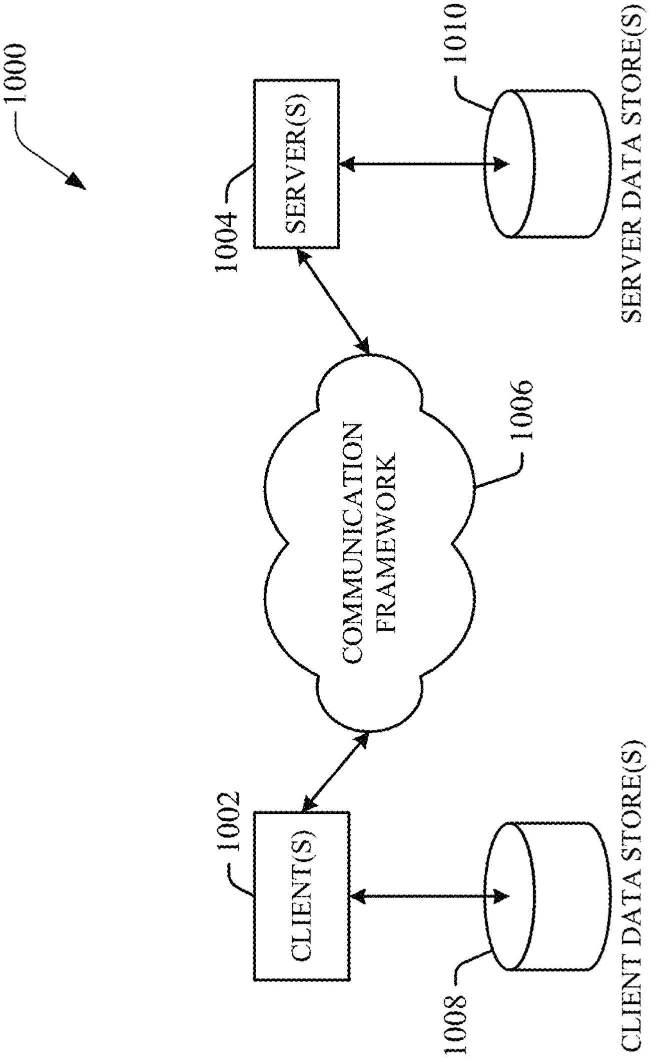
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various example embodiments. It is, of course, not possible to describe every conceivable combination of components, modules, or methods for purposes of describing the disclosed subject matter, and one skilled in the art may recognize that further combinations and permutations of the various example embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various example embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

identifying changes to data in a file of a file system relative to a first version of an object chunk representative of the data in an object store, wherein the data is determined to comprise a defined data retention policy, wherein the first version of the object chunk comprises a first version in a baseline replication of the file system to the object store, and wherein the baseline replication results in a baseline dataset against which subsequent changes of the data stored in the file system are identified, wherein the identifying changes to the data comprises a determination that the first version of the object chunk satisfies a criterion of the defined data retention policy;

copying, based on the identifying changes, changed data, of the data, from the file system to a second version of the object chunk;

copying, based on the identifying changes, unchanged data, of the data, from the first version of the object chunk to the second version of the object chunk;

generating a snapshot object based on the copying changed data and the copying unchanged data, wherein the snapshot object comprises an empty object that comprises metadata pointing from the second version of the object chunk to the first version of the object chunk, wherein the second version of the object chunk comprises a version in an incremental replication of the file system to the object store, wherein the second version integrates changed data from the file system with unchanged data from the first version;

designating the second version of the object chunk as a head object in the object store, wherein the head object stores, in the object store, all file data for the file represented by the object chunk, and wherein copy-on-write redirect objects associated with the head object comprise empty objects that store metadata pointers to the head object and do not contain file data; and in response to the copying changed data and the copying unchanged data, changing the head object from the first version of the object chunk to the second version of the object chunk.

2. The system of claim 1, wherein the operations further comprise:

designating the first version of the object chunk as a prior version in the object store.

3. The system of claim 1, wherein the object chunk comprises a dataset identifier applicable to the file system.

4. The system of claim 1, wherein the object chunk comprises a file identifier applicable to the data.

5. The system of claim 1, wherein a first object name of the first version of the object chunk and a second object name of the second version of the object chunk are respectively based on version numbers of the object chunk.

6. The system of claim 1, wherein the head object comprises a plurality of object chunks, wherein each object chunk of the plurality of object chunks is between approximately 4 megabytes and approximately 8 megabytes in size.

7. A non-transitory machine-readable medium, comprising executable instructions that, when executed by at least one processor, facilitate performance of operations, comprising:

determining changes to file data stored in a file system relative to an initial version of an object chunk representative of the file data in an object store, wherein the file data is determined to comprise a defined write-once-read-many data retention policy, wherein the determining changes to file data comprises a determination that the initial version of the object chunk satisfies a criterion of the defined write-once-read-many data retention policy;

storing, by utilizing a pseudo-copy-on-write replication of the file system to the object store and based on the determining changes, changed data, of the file data that is copied, from the file system to an updated version of the object chunk;

storing, via a transfer component and based on the determining changes, unchanged data; of the file data that is copied, from the initial version of the object chunk to the updated version of the object chunk;

generating, based on the copied changed data and the copied unchanged data, a snapshot object, wherein the snapshot object comprises an empty object that comprises metadata pointing from the updated version of the object chunk to the initial version of the object chunk;

designating the updated version of the object chunk as a head object in the object store, wherein the head object stores, in the object store, all file data for a file represented by the object chunk;

maintaining the head object as a fully populated repository of the file data, wherein copy-on-write redirect objects, which are associated with respective dataset versions of the file system, comprise empty objects that store metadata pointers to the head object and do not contain file data, and wherein the defined write-once-read-many data retention policy for each respective dataset version is satisfied through retention of the head object, without storing duplicate file data for each respective dataset version of the respective data set versions in the object store; and in response to copying the changed data and copying the unchanged data, changing the head object from the initial version of the object chunk to the updated version of the object chunk.

8. The non-transitory machine-readable medium of claim 7, wherein the initial version of the object chunk comprises a first version in a baseline replication of the file system to the object store.

9. The non-transitory machine-readable medium of claim 7, wherein the updated version of the object chunk comprises a version in an incremental replication of the file system to the object store.

10. The non-transitory machine-readable medium of claim 7, wherein the object chunk is between approximately 4 megabytes and approximately 8 megabytes.

11. The non-transitory machine-readable medium of claim 7, wherein the object store comprises a cloud-based object store.

12. The non-transitory machine-readable medium of claim 7, wherein the defined write-once-read-many data retention policy comprises a defined retention time or defined deletion permissions.

13. The non-transitory machine-readable medium of claim 7, wherein the head object comprises a plurality of object chunks, wherein each object chunk of the plurality of object chunks is approximately 4 megabytes and approximately 8 megabytes in size.

14. A method, comprising:

detecting, by a system comprising at least one processor, modifications to a file of a file system relative to a first version of an object chunk, representative of a portion of the file, in an object store, wherein the file is determined to comprise a defined data retention rule, wherein the detecting modifications to a file comprises a determination that the first version of the object chunk satisfies a criterion of the defined data retention rule;

wherein the object chunk is identified using a dataset identifier applicable to the file system and a file identifier applicable to the file, wherein the file identifier is allocated as a globally unique identifier for the file, wherein the file identifier remains constant across all versions of the file, wherein the dataset identifier is allocated as a globally unique identifier for each dataset version, wherein the dataset identifier changes with each incremental replication while the file identifier remains constant with each incremental replication, and wherein a tuple comprising the file identifier and the dataset identifier is utilized to identify respective concrete versions of the file in the object store;

copying, by the system and based on the modifications to a file, modified data of the file from the file system to a second version of the object chunk in the object store;

copying, by the system and based on the modifications to a file, unmodified data of the file from the first version of the object chunk to the second version of the object chunk in the object store;

generating based on the copying modified data and the copying unmodified data, by the system, a snapshot object, wherein the snapshot object comprises an empty object that comprises metadata pointing from the second version of the object chunk to the first version of the object chunk;

designating, by the system, the second version of the object chunk as a head object in the object store, wherein respective object names in the object store are hierarchically rendered using respective dataset identifiers and respective file identifiers, and wherein the tuple is encoded into an object name of the object chunk as a hierarchical path that comprises a dataset-identifier component and a file-identifier component, and wherein object names in the object store are organized in a hierarchy according to respective dataset identifiers and respective file identifiers; and in response to the copying modified data and the copying unmodified data, changing the head object from the first version of the object chunk to the second version of the object chunk.

15. The method of claim 14, wherein the defined data retention rule comprises a defined write-once-read-many data retention rule.

16. The method of claim 14, wherein the object chunk is among of a group of object chunks representative of the file system stored in a data bucket, of the object store, applicable to the file system.

17. The method of claim 14, wherein the first version of the object chunk and the second version of the object chunk are among a group of versions of the object chunk, and wherein the group of versions of the object chunk comprises additional versions of the object chunk, in addition to the first version of the object chunk and the second version of the object chunk.

18. The method of claim 14, further comprising:

in response to a determination that an age of the first version of the object chunk satisfies a deletion criterion of the defined data retention rule, deleting, by the system, the first version of the object chunk, wherein the deletion criterion is a function of a defined elapsed time since creation of the first version of the object chunk.

19. The method of claim 14, further comprising:

generating, by the system, a pseudo-copy-on-write redirect object that comprises metadata pointing to a head version of an object chunk, wherein the pseudo-copy-on-write redirect object does not contain file data.

* * * * *